=""

US011586919B2

(12) United States Patent
Zhu et al.

(10) Patent No.: US 11,586,919 B2
(45) Date of Patent: Feb. 21, 2023

(54) TASK-ORIENTED MACHINE LEARNING AND A CONFIGURABLE TOOL THEREOF ON A COMPUTING ENVIRONMENT

(71) Applicant: International Business Machines Corporation, Armonk, NY (US)

(72) Inventors: Yada Zhu, Westchester, NY (US); Di Chen, Ithaca, NY (US); Xiaodong Cui, Chappaqua, NY (US); Upendra Chitnis, Fairfield, CT (US); Kumar Bhaskaran, Englewood Cliffs, NJ (US); Wei Zhang, Harbin (CN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 16/899,681

(22) Filed: Jun. 12, 2020

(65) Prior Publication Data
US 2021/0397941 A1     Dec. 23, 2021

(51) Int. Cl.
*G06N 3/08*     (2006.01)
*G06N 3/04*     (2006.01)
*G06Q 40/00*     (2012.01)
*G06Q 40/06*     (2012.01)

(52) U.S. Cl.
CPC ............ *G06N 3/08* (2013.01); *G06N 3/0445* (2013.01); *G06Q 40/00* (2013.01); *G06Q 40/06* (2013.01)

(58) Field of Classification Search
CPC ...... G06N 3/08; G06N 3/0445; G06Q 10/103; G06Q 40/00; G06Q 40/06; G06F 16/90335; G06F 3/0482; G06F 9/445; H04L 63/0815
See application file for complete search history.

(56) References Cited

U.S. PATENT DOCUMENTS

| | | | |
|---|---|---|---|
| 9,547,821 B1* | 1/2017 | Loreggia | G06N 20/00 |
| 9,754,221 B1 | 9/2017 | Nagaraja | |
| 2019/0147298 A1* | 5/2019 | Rabinovich | G06N 3/0445 |
| | | | 382/157 |
| 2019/0325259 A1* | 10/2019 | Murphy | G06N 20/00 |
| 2020/0034665 A1 | 1/2020 | Ghanta et al. | |
| 2020/0160178 A1* | 5/2020 | Kar | G06N 3/08 |
| 2021/0073612 A1* | 3/2021 | Vahdat | G06F 7/57 |

(Continued)

OTHER PUBLICATIONS

Chen, Di et al, "Task-Based Learning via Task-Oriented Prediction Network with Applications in Finance" Jun. 26, 2020, accessed from https://www.cs.cornell.edu/gomes/pdf/2019_chen_arxiv_topnet.pdf (Year: 2020).*

(Continued)

*Primary Examiner* — Sarah M Monfeldt
*Assistant Examiner* — Andrew Chase Lakhani
(74) *Attorney, Agent, or Firm* — Scully, Scott, Murphy & Presser, P.C.; Daniel P. Morris

(57) ABSTRACT

A task-based learning using task-directed prediction network can be provided. Training data can be received. Contextual information associated with a task-based criterion can be received. A machine learning model can be trained using the training data. A loss function computed during training of the machine learning model integrates the task-based criterion, and minimizing the loss function during training iterations includes minimizing the task-based criterion.

20 Claims, 9 Drawing Sheets

(56) References Cited

U.S. PATENT DOCUMENTS

2021/0256387 A1* 8/2021 Chopra ................ G06K 9/6256
2021/0264272 A1* 8/2021 Luo ..................... G06N 3/0454

OTHER PUBLICATIONS

Chen, Di, et al., "Task-Based Learning," https://www.cs.cornell.edu/gomes/pdf/2019_chen_arxiv_topnet.pdf, Dec. 11, 2019, 8 pages (Grace Period Disclosure).

Huang, C., et al., "Addressing the Loss-Metric Mismatch with Adaptive Loss Alignment," arXiv.org, arXiv:1905.05895v1, May 15, 2019, 13 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

TASK-ORIENTED MACHINE LEARNING AND A CONFIGURABLE TOOL THEREOF ON A COMPUTING ENVIRONMENT

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): "Task-Based Learning," Chen, D., et al., https://www.cs.cornell.edu/gomes/pdf/2019_chen_arxiv_topnet.pdf, Dec. 11, 2019.

BACKGROUND

The present application relates generally to computers and computer applications, and more particularly to machine learning, training machine learning models such as neural network models, and a configurable tool utilizing method of operation thereof on a computing environment such as a cloud-based computing environment.

Machine learning techniques have been widely used in various areas. The specific tasks in various domains often have their customized performance metrics. For instance, portfolio management tools may include forecasting of key finance indicators, such as the quarterly revenue of public companies. In forecasting public company's quarterly revenue or earnings, the customized metrics may include both the directional errors, absolute errors and their combinations compared with a set of benchmarks. For inventory management tools, which perform demand forecasting, the customized metrics that directly relates to cost may include directional accuracy (over/under forecast), absolute errors (miss sale amount/overstock amount) and their combinations. Power generation planning tools, which may perform load forecasting also has a similar complicated customized metrics.

Classical machine learning methods use differentiable performance metrics such as mean absolute error (MAE), mean square error (MSE), and root mean square error (RMSE). However, these common losses are not necessarily aligned with customized metrics. In addition, customized metrics are not necessarily differentiable, and may present challenges for applying machine learning or deep learning models.

BRIEF SUMMARY

Task-oriented machine learning and a configurable tool thereof can be provided on a computing environment such as cloud-based computing environment. A computer-implemented method, in one aspect, can include receiving training data. The method can also include receiving contextual information associated with a task-based criterion. The method can further include training a machine learning model such as a neural network using the training data, wherein a loss function computed during the training integrates the task-based criterion, and wherein minimizing the loss function during training iterations includes minimizing the task-based criterion.

In another aspect, the method can include providing a tool for building and managing the machine leaning model on a computing environment, the computing environment allowing an on-demand network access to a shared pool of configurable computing resources, the configurable computing resources including at least one of networks, network bandwidth, servers, processing, memory, storage, applications, virtual machines, and services.

A system, in one aspect, can include a hardware processor and a memory device coupled with the hardware processor. The hardware processor can be configured to receive training data. The hardware processor can further be configured to receive contextual information associated with a task-based criterion. The hardware processor can further be configured to train a machine learning model using the training data, wherein a loss function computed during training of the machine learning model integrates the task-based criterion, and wherein minimizing the loss function during training iterations includes minimizing the task-based criterion.

In another aspect, the hardware processor can be provided on a computing environment allowing an on-demand network access to a shared pool of configurable computing resources. The configurable computing resources can include at least one of networks, network bandwidth, servers, processing, memory, storage, applications, virtual machines, and services.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
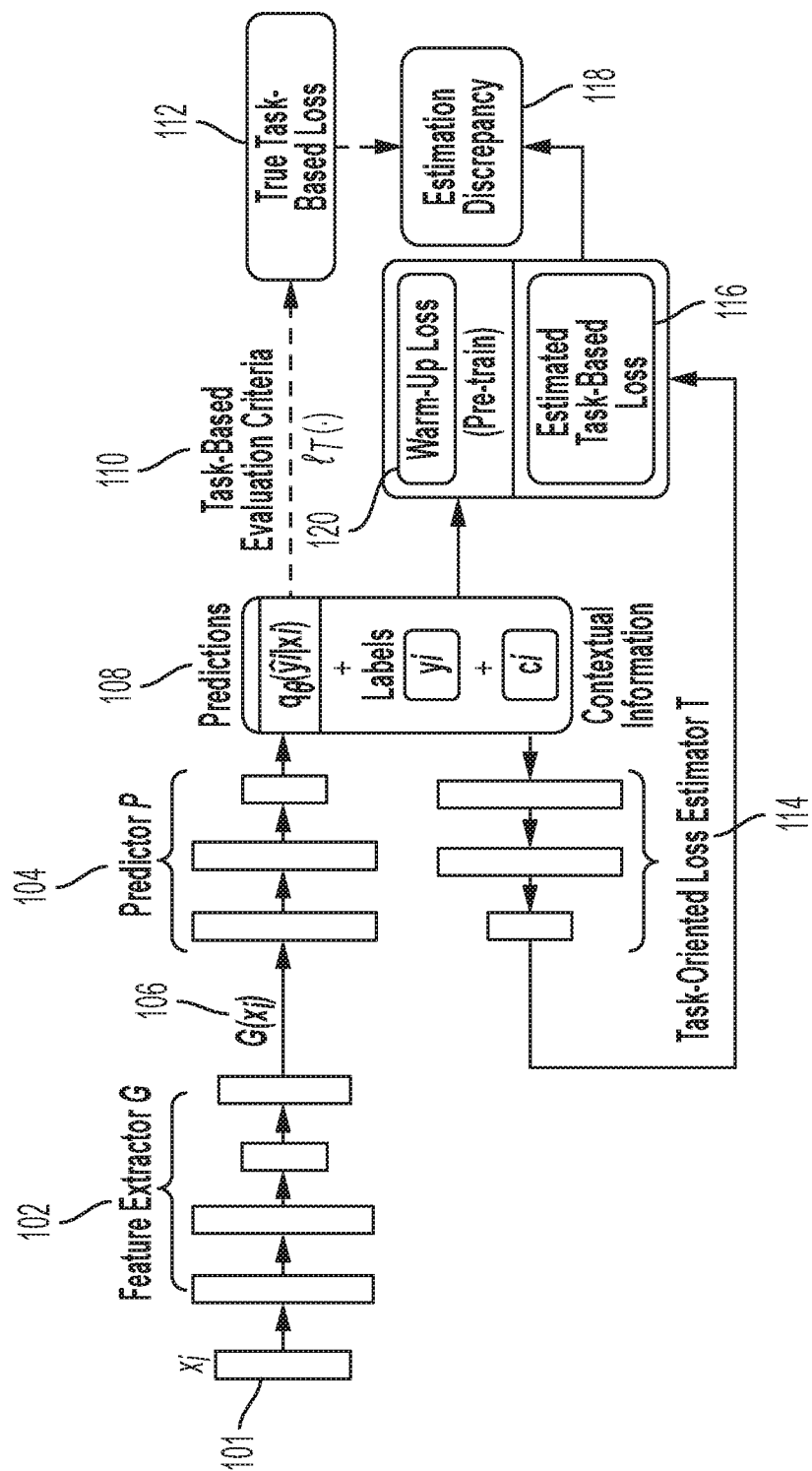
FIG. 1 is a diagram illustrating an overview of a Task-Oriented Prediction Network in an embodiment.

Systems, methods and techniques for a metric-oriented learning machine are disclosed. A metric-oriented learning machine, in embodiments, can automatically approximate given customized metrics, for example, via reinforcement learning to boost performance over a common loss.

In an aspect, a general learning framework or method is provided that integrates customized performance metrics into a learning process, for example, via a task-oriented estimator, and learns a machine learning model that directly optimizes the ultimate task-based goal or target. The performance metrics, which are customized, need not be aligned with standard learning metrics and need not be differentiable. In an aspect, such a learning framework can be integrated within a cloud-based system to deploy the learning framework in various services. An example cloud-based system is further described below with reference to FIGS. 3 and 4. An example of a service can include, but is not limited to, a financial service for optimizing investment decisions, financial forecasting, and performing analysis such as a loan approval tools based on credit risk analysis and modeling, and inventory management tool, power generation planning tools and/or others.

In an aspect, the disclosed system and/or method can meld the gap between upstream model learning and downstream application scenario by integrating performance metrics into a learning process. The disclosed system and/or method may also incorporate an approximation of non-differentiable customized performance metrics via a differentiable value function in the learning process, and optimize the machine learning model, e.g., a predictor, based on the value function. The disclosed system and/or method may further hybridize a heuristic loss function within the learning process, which can ensure a stable learning process.

In an aspect, the disclosed system and/or method may use a differentiable heuristic metric and a reward estimator network to approximate a non-differentiable customized reward metrics, and optimize a predictor toward the approximated reward. In an aspect, the disclosed system and/or method may include batchwise attention to better approximate metrics that captures overall prediction performance (e.g., ranking, relative direction). In an aspect, a disclosed learning scheme may include a capability of automatically integrating non-differentiable evaluation criteria, which for example, can be suitable for diversified and customized task-based evaluation criteria in real-world prediction tasks.

Real-world applications often involve domain-specific and task-based performance objectives that are not captured by the standard machine learning losses, but may be needed decision making. A challenge for direct integration of more meaningful domain and task-based evaluation criteria into an end-to-end gradient-based training process, for example, in machine learning such as a neural network, is the fact that often such performance objectives are not necessarily differentiable and may even require additional decision-making optimization processing. In embodiments, a Task-Oriented Prediction Network (TOPNet) is disclosed, which is an end-to-end learning scheme that automatically integrates task-based evaluation criteria into the learning process via a learnable surrogate loss function, which directly guides the model towards the task-based goal. A benefit of the TOPNet learning scheme lies in its capability of automatically integrating non-differentiable evaluation criteria, which makes it suitable for diversified and customized task-based evaluation criteria in real-world tasks. Applications of TOPNet can include, but not limited to, real-world financial prediction tasks such as revenue surprise forecasting and credit risk modeling. Experimental results demonstrate that TOPNet significantly outperforms both traditional modeling with standard losses and modeling with hand-crafted heuristic differentiable surrogate losses.

Prediction models have been used to facilitate decision making across domains, e.g., retail demand prediction for inventory control, user behavior prediction for display advertisement, and financial market movement prediction for portfolio management, to name a few. These models are often trained using standard machine learning loss functions, such as mean square error (MSE), mean absolute error (MAE) and cross-entropy loss (CE). However, these criteria commonly used to train prediction models can be different from the task-based criteria used to evaluate model performance. For instance, a standalone image classification model is often trained by optimizing cross-entropy loss. However, when it is used to guide autonomous driving, one may care more about misclassifying a traffic sign than misclassifying a garbage can. In revenue surprise forecasting, financial institutes often train a regression model to predict the revenue surprise for each public company minimizing mean square error. However, they evaluate the model performance based on the "Directional Accuracy" (percentage of predictions that are more directional accurate) and the "Magnitude Accuracy" (percentage of predictions that are 50% more accurate) with respect to industry benchmarks (e.g., the consensus of professional analysts), which provide more value for downstream portfolio management. In loan default risk modeling, banks often train a classification model to predict the default probability of each loan application, and optimize the probability threshold to accept or reject loans with low or high risk. Eventually, they evaluate the model performance by aggregating the total profit made from those loans.

Models trained with standard machine learning losses are not necessarily aligned with the task-based evaluation criteria and as a result may perform less than optimally with respect to the ultimate task-based objective. A solution to this problem is to directly use the task-based evaluation criteria as the loss function. However, task-based evaluation criteria can present difficulty to an end-to-end gradient-based training process due to the fact that often such performance objectives are not necessarily differentiable and may even require additional decision-making optimization processing. Existing works in this area mainly focus on deriving heuristic surrogate loss functions that differentiate from downstream evaluation criteria to the upstream prediction model via certain relaxations or Karush-Kuhn-Tucker (KKT) conditions. Those derivations are mainly hand-crafted and task-specific, and as a result, may require an amount of effort to find proper surrogate losses for new tasks, especially when the evaluation criteria are complicated or involve non-convex optimization. Hand-crafted surrogate losses also can be difficult to optimize, and may present less than an optimal choice. The disclosed system and/or method, in embodiments, provide a general end-to-end learning scheme, which can automatically integrate the task-based evaluation criteria.

The disclosed Task-Oriented Prediction Network (TOPNet) can be a generic end-to-end learning scheme that automatically integrates task-based evaluation criteria into the learning process via a learnable differentiable surrogate loss function, which approximates the true task-based loss and directly guides the prediction model to the task-based goal. In an embodiment, TOPNet learns a differentiable surrogate loss function parameterized by a task-oriented loss estimator network that approximates the true task-based loss given the prediction, the ground-truth label and necessary contextual information. TOPNet optimizes a predictor using the learned surrogate loss function, to approximately optimize its performance with respect to (w.r.t.) the true task-based loss. By way of example, the performance of TOPNet is demonstrated on two real-world financial prediction tasks (e.g., a revenue surprise forecasting task and a credit risk modeling task, where the former is a regression task and the latter is a classification task). Applying TOPNet to these two tasks showed that TOPNet significantly boosts the ultimate task-based goal by integrating the task-based evaluation criteria, outperforming both traditional modeling with standard losses and modeling with heuristic differentiable (relaxed) surrogate losses. TOPNet can be applied to other practical tasks such as in industrial processing.

In an embodiment, Task-Oriented Prediction Network (TOPNet) need not require hand-crafted differentiation of the downstream evaluation criteria. In an embodiment, TOPNet learns a differentiable surrogate loss via a task-oriented loss estimator network, which automatically approximates the true task-based loss and directly guides the upstream predictor towards the downstream task-based goal. In the context of task-based learning, for example, TOPNet automatically integrates the true task-based evaluation criteria into an end-to-end learning process via a learnable surrogate loss function.

In an embodiment, the following formally defines the task-based prediction problem that can be addressed. The system and/or method may use $x \in X \subseteq \mathbb{R}^d$ and $y \in \mathcal{Y}$ for the feature and label variables. Given dataset $D=\{(x_1,y_1), (x_2, y_2) \ldots, (x_n,y_n)\}$, which is sampled from an unknown data distribution P with density function $p(x,y)$, a prediction task can be formulated as learning a conditional distribution $q_\theta(\hat{y}|x)$ that minimizes the expected task-based loss (task-based criteria) $\ell^T(q_\theta(\hat{y}|x),p(y|x),c)$, i.e., $$\min_\theta \mathbb{E}_{x:p(x)}[\ell^T(q_\theta(\hat{y}|x)p(y|x),c)], \quad (1)$$

where c denotes some necessary contextual information related to task-based criteria, $p(x)$ denotes the marginal distribution of x, and $\theta$ denotes the parameters of the prediction model. As implied in formulation (1), the system and/or method considers the tasks whose task-based losses can be computed point-wisely.

A challenge of task-based learning comes from the fact that the true task-based loss function $\ell^T(q_\theta(\hat{y}|x),p(y|x),c)$ is often non-differentiable and may even involve additional decision-making optimization processing, which is difficult to use directly in gradient-based learning methods. For instance, in revenue surprise forecasting, the task-based criteria evaluate a prediction $\hat{y}$ based on both the true revenue surprise y and the prediction of the consensus of the professional analysts c (in that case, both $q_\theta(\hat{y}|x)$ and $p(y|x)$ are Dirac delta distribution). Specifically, the criteria compute whether the prediction is more directional accurate and whether the prediction is significantly (50%) more accurate compared with the consensus, which both involve non-differentiable functions. Likewise, in credit risk modeling, the task-based criteria involve optimizing a probability decision threshold $p_D$ to maximize the profit after approving all loan applications with a predicted default probability $p_i$ lower than $p_D$.

A solution to this challenge is to use a surrogate loss function $\ell^S(q_\theta(\hat{y}|x),p(y|x),c)$ to replace the true task-based loss and guide the learning process. For example, a solution can be using standard machine learning loss functions, such as mean square error (MSE), mean absolute error (MAE) and cross-entropy loss (CE), or other task-specific differentiable loss functions as the surrogate loss, that is, $$\min_\theta \mathbb{E}_{x:p(x)}[\ell^S(q_\theta(\hat{y}|x)p(y|x),c)]. \quad (2)$$

For instance, both standard machine learning losses and task-specific differentiable losses can be selected manually. However, finding a proper surrogate loss function may require a considerable amount of effort, especially when the evaluation criteria are complicated or involve non-convex optimization. Therefore, such approaches require considerable customization and do not provide a general methodology to task-based learning.

In an embodiment, instead of manually designing a hand-crafted differentiable loss, the disclosed system and/or method learn a differentiable surrogate loss function $\ell_\omega^S(q_\theta(\hat{y}|x),p(y|x),c)$ via a neural network parameterized by $\omega$, to approximate the true task-based loss and guide the prediction model. Specifically, the system and/or method may formulate the task-based learning problem as a bilevel optimization, i.e., $$\min_\theta \mathbb{E}_{x \sim p(x)}[\ell_{\omega^*}^S(q_\theta(\hat{y}|x), p(y|x), c)] \quad (3)$$

subject to:

$$\omega^* = \quad (4)$$
$$\operatorname{argmin}_\omega \mathbb{E}_{x \sim p(x)}[D(\ell_\omega^S(q_\theta(\hat{y}|x), p(y|x), c) \| \ell^T(q_\theta(\hat{y}|x), p(y|x), c))],$$

where $D(\cdot \| \cdot)$ is a discrepancy function.

In an embodiment, the system and/or method assume that both $\ell_\omega^S(q_\theta(\hat{y}|x),p(y|x),c)$ and $\ell^T(q_\theta(\hat{y}|x),p(y|x),c)$ are real-valued loss functions. Thus, the system and/or method may consider using absolute error loss or square error loss as the discrepancy function, i.e., $D(x\|y)=|x-y|$ or $D(x\|y)=(x-y)^2$.

$$\mathbb{E}_{x \sim p(x)}[\ell^T(q_\theta(\hat{y}|x),p(y|x),c)]$$
$$\leq \mathbb{E}_{x \sim p(x)}[\ell_\omega^S(q_\theta(\hat{y}|x),p(y|x),c)]] + \mathbb{E}_{x \sim p(x)}[|\ell_\omega^S(q_\theta(\hat{y}|x),p(\hat{y}|x),c) - \ell^T(\hat{y}|x),p(y|x),c)|] \quad (5)$$
$$\leq \mathbb{E}_{x \sim p(x)}[\ell_\omega^S(q_\theta(\hat{y}|x),p(y|x),c)]] + \mathbb{E}_{x \sim p(x)}^{1/2}[\ell_\omega^S(q_\theta(\hat{y}|x),p(\hat{y}|x),c) - \ell^T(q_\theta(\hat{y}|x),p(y|x),c))^2] \quad (6)$$

(Jensen's Inequality)

As shown in the inequality (5) and (6), if the system and/or method use absolute/square error loss as the discrepancy function and minimize the discrepancy term (4) to a small value $\epsilon/\epsilon^2$, then the system and/or method have $$\mathbb{E}_{x \sim p(x)}[\ell^T(q_\theta(\hat{y}|x),p(y|x),c)] \leq \mathbb{E}_{x \sim p(x)}[\ell_\omega^S(\hat{y}|x),p(y|x),c)] + \epsilon.$$

Therefore, since the expected true task-based loss is upper bounded by the expected surrogate loss plus the discrepancy, the system and/or method can approximately (with an $\epsilon$-tolerance) learn the prediction model $q_\theta(\hat{y}|x)$ w.r.t. the task-based loss via solving the above bilevel optimization problem.

In an embodiment, the system and/or method can use Lagrangian relaxation (LR) to tackle the above bilevel optimization problem, i.e., $$\min_{\theta,\omega} \mathbb{E}_{x \sim p(x)}[\ell_\omega^S(q_\theta(\hat{y}|x), p(y|x), c)] + \quad (7)$$
$$\lambda \mathbb{E}_{x \sim p(x)}[D(\ell_\omega^S(q_\theta(\hat{y}|x), p(y|x), c) \| \ell^T(q_\theta(\hat{y}|x), p(y|x), c))],$$

where $\lambda$ is a non-negative weight (we set $\lambda = 1$).

In an aspect, given the fact that $\ell^T(q_\theta(\hat{y}|x),p(y|x),c)$ is non-differentiable, one may not directly use gradient-based method to minimize LR (7) w.r.t. both $\theta$ and $\omega$. However, though the second term in the LR (7) is non-differentiable w.r.t. θ, it is differentiable w.r.t. ω given the fact that $\ell^T(q_\theta(\hat{y}|x), p(y|x), c)$ does not involve ω and $\ell_\omega^S(q_\theta(\hat{y}|x), p(y|x), c)$ is differentiable. Therefore, instead of minimizing LR (7) directly using all parameters, the system and/or method may separate the optimization regarding θ and ω, and only minimize the first term in LR (7) w.r.t. θ, i.e., $$\min_\theta \mathbb{E}_{x \sim p(x)} [\ell_\omega^S(q_\theta(\hat{y}|x), p(y|x), c)] \quad (8)$$

$$\min_\omega \mathbb{E}_{x \sim p(x)} [\ell_\omega^S(q_\theta(\hat{y}|x), p(y|x), c)] + \quad (9)$$
$$\mathbb{E}_{x \sim p(x)} [D(\ell_\omega^S(q_\theta(\hat{y}|x), p(y|x), c) \| \ell^T(q_\theta(\hat{y}|x), p(y|x), c))]$$

In an embodiment, the system and/or method are alternating between (i) optimizing the prediction model $q_\theta(\hat{y}|x)$ w.r.t. the current learned surrogate loss and (ii) minimizing the gap between the learned surrogate loss and the true task-based loss obtained from the current prediction model. In an aspect, the learning of the prediction model and the surrogate loss depends on each other. Thus, a bad surrogate loss would mislead the prediction model and vice versa. For example, if the true task-based loss is a bounded loss function, then with a bad prediction model the learned surrogate loss is likely to get stuck on some insensitive area, where the loss is saturated due to the huge difference between $q_\theta(\hat{y}|x)$ and $p(y|x)$. Therefore, instead of starting learning the prediction model with a randomly initialized surrogate loss function, the system and/or method may "warm-up" the prediction model $q_\theta(\hat{y}|x)$ with a designed warm-up loss function $\ell^W(q_\theta(\hat{y}|x), p(y|x), c)$. Thus, the system and/or method can warm up the prediction model to be close to the ground truth so that the learning of the surrogate loss would focus more on the sensitive area and better boost the task-based performance. In experiments, different warm-up losses can be investigated ranging from standard machine learning losses to heuristic surrogate losses. It can be empirically shown that the model would achieve a better performance with the "warm-up" step.

The system and/or method may instantiate the task-based learning process described above via the Task-Oriented Prediction Network (TOPNet). FIG. 1 is a diagram illustrating an overview of a Task-Oriented Prediction Network in an embodiment. The method can be executed by or run on one or more processors such as hardware processors, and for example, can be configured or provisioned on a computing environment such as a cloud-based computing environment. A feature extractor G 102 is first applied to extract meaningful features from the raw input data $x_i$ 101. Then, a predictor network P 104 takes the extracted feature $G(x_i)$ 106 to predict the conditional distribution $P(G(x_i)) = q_\theta(\hat{y}_i|x_i)$ (θ denotes the parameters in P and G) 108. In an embodiment, if the system and/or method do not have access to the true distribution $p(y,x)$, the system and/or method can use the empirical distribution, i.e., a uniform distribution $p(y_i, x_i)$ over samples in the dataset, to replace $p(y,x)$. Given the fact that the conditional distribution $p(y_i|x_i)$ is indeed a Dirac Delta distribution over the value $y_i$, for ease of presentation, the system and/or method can use the point-wise ground truth label $y_i$ to replace the role of $p(y_i|x_i)$ in the following content. With the prediction $q_\theta(\hat{y}_i|x_i)$, the ground truth label $y_i$ and necessary contextual information $c_i$ concerning the task, as shown at 108, the system and/or method can invoke the true task-based evaluation criteria 110, which potentially involve a decision-making optimization process, to generate the true task-based loss $\ell^T(q_\theta(\hat{y}_i|x_i), y_i, c_i)$ 112.

Meanwhile, a task-oriented loss estimator network T 114 takes the predictions $q_\theta(\hat{y}_i|x_i)$, the labels $y_i$, and the contextual information $c_i$, as shown at 108, to approximate the true task-based loss via minimizing the discrepancy 118 between the learned surrogate loss $\ell_{\omega_T}^S(q_\theta(\hat{y}_i|x_i), y_i, c_i)$ ($\omega_T$ denotes the parameters in T) 116 and the true task-based loss 112. The system and/or method can update the prediction model using the gradients obtained from the learned surrogate loss function. In an embodiment, to facilitate the learning of both $q_\theta(\hat{y}|x)$ and $\ell_{\omega_T}^S(q_\theta(\hat{y}_i|x_i), y_i, c_i)$, the system and/or method may warm-up the prediction model using a warm-up loss function $\ell^W(q_\theta(\hat{y}|x), y_i, c_i)$ 120, which could be either a standard machine learning loss or a designed heuristic loss, for the first $N_{pre}$ iterations. For example, the system and/or method may use the square error as the loss discrepancy function $D(\cdot\|\cdot)$ due to its better empirical performance compared with the absolute error. The system and/or method may empirically set the hyper-parameter $N_{pre} = |D_{train}|$ to just warm up the prediction model for one training epoch.

In an embodiment, the feature extractor G 102 can be a Long Short-Term Memory (LSTM) network. In another embodiment, the feature extractor G 102 can be a neural network such as a 3-layer fully-connected neural network. In an embodiment, the predictor P 104 can be any machine learning model, for example, a neural network such as a 3-layer fully-connected neural network with a number of hidden units. A neural network can be implemented with any other number of layers and number of hidden units. In an embodiment, the task-oriented loss estimator T 114 can be a neural network, for example, a 3-layer fully-connected neural network with hidden units. Any other machine learning models can be implemented for the feature extractor G 102, predictor P 104 and task-oriented loss estimator T 114.

Briefly, an artificial neural network (ANN) or neural network (NN) is a machine learning model, which can be trained to predict or classify input data. An artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data. By way of example, only, FIG. 1 shows neural network layers of extractor G 102, predictor P 104 and task-oriented loss estimator T 114, as bars.

Algorithm 1 summarizes an implementation of the alternative minimizing process in an embodiment of an end-to-end learning process for TOPNet, for example, shown in FIG. 1.

---
Algorithm 1: End-to-End learning process for TOPNet
---

Input: $x_i$, $y_i$ and $c_i$ are raw input features, ground-truth label
and corresponding contextual information sampled iid from the training
set $D_{train}$. $\ell^T(\cdot, \cdot, \cdot)$ is the true task-based loss function. $\ell^W(\cdot, \cdot, \cdot)$
is the warm-up loss function. $D(\cdot \| \cdot)$ is the loss discrepancy function.
T, P and G denote the task-based loss estimator, the predictor and the
feature extractor respectively. $N_{train}$ is the number of training iterations.
$N_{pre}$ is the number of iterations for "warm-up" pretraining.
For ease of presentation, here it is assumed the batch size is 1. Other
batch sizes can be employed.
1:   for t ← 1 to $N_{train}$ do
2:     Sample a data point $(x_i, y_i)$ from $D_{train}$.
3:     Make prediction $q_\theta(\hat{y}_i|x_i) = P(G(x_i))$.
4:     Invoke the true task-based criteria to compute the true task-based loss $\ell^T(q_\theta(\hat{y}_i|x_i), y_i, c_i)$.
5:     Approximate the true task-based loss using the learnable surrogate loss $\ell^S_{\omega_T}(q_\theta(\hat{y}_i|x_i), y_i, c_i) = T(q_\theta(\hat{y}_i|x_i), y_i, c_i)$.
6:     Update the task-oriented estimator T via $$\min_{\omega_T} D\big(\ell^S_{\omega_T}(q_\theta(\hat{y}_i|x_i), y_i, c_i) \big\| \ell^T(q_\theta(\hat{y}_i|x_i), y_i, c_i)\big).$$

7:     if $t \leq N_{pre}$ then Update the prediction model (P and G) using the warm-up loss:

$$\min_{\theta_G, \theta_P} \ell^W(q_\theta(\hat{y}_i|x_i), y_i, c_i).$$

8:     else Update the prediction model (P and G) using the learned surrogate loss:

$$\min_{\theta_G, \theta_P} \ell^S_{\omega_T}(q_\theta(\hat{y}_i|x_i), y_i, c_i).$$

9:     end if
10: end for

---

TOPNet is a generic learning scheme that can be used in a variety of applications with task-based criteria. The following validates its performance via datasets from two real-world applications in finance. The experiments compare the benefit of using TOPNet learning scheme over standard machine learning schemes or hand-crafted heuristic surrogate loss functions.

By way of example, experimental models can be trained with a training process performed for a number of epochs, for example, 50 epochs, for example, using a batch size of 1024. An Adam optimizer can be used with a learning rate of 3e-5, and early stopping can be employed to accelerate the training process and prevent overfitting.

The following describes applying the TOPNet learning scheme in revenue surprise forecasting example in an embodiment. Revenue growth can be the key indicator of the valuation and profitability of a company and can be used for investment decisions, such as stock selection and portfolio management. Due to the long tail distribution of revenue growth, the investment communities usually predict revenue surprise which is given by revenue growth minus "consensus". Here, "consensus" can be the average of the estimates of revenue growth published by stock analysts. While revenues are published quarterly, daily forecasts of revenue surprise enable investors to adjust their portfolio in a granular way for return and risk analysis. To predict quarterly revenue surprise at the daily level before their announcement, information can be collected including quarterly revenue, consensus, stock price and various of financial indicators of companies during a period, for example, over a number of years (e.g., 15 years). Each data point can be associated with a 10×12-dimensional feature vector describing up-to-date sequential historical information of the corresponding company. In this example experiment, the label of each data point is a real number describing the revenue surprise of the corresponding company on that specific date. The whole dataset can be split chronologically into training set, validation set and test set to validate the performance of models. In an embodiment, a model can be learned for each company. In another embodiment, all data points can be used to learn a company-agnostic prediction model. It is possible to build a multi-task learning framework for this specific task.

Task-Based Criteria

In this regression problem, the task-based criterion is the total reward calculated based on the Directional Accuracy (DirAcc) and the Magnitude Accuracy (MagAcc) with respect to the industry benchmark, "consensus". To be specific, $$DirAcc_i = \begin{cases} \alpha & if\, sign(\tilde{\hat{y}}_i) = sign(\tilde{y}_i) \\ -\beta & if\, sign(\tilde{\hat{y}}_i) \neq sign(\tilde{y}_i) \end{cases} \quad MagAcc_i = \begin{cases} \gamma & if\, |y_i - \hat{y}_i| < 0.5|y_i| \\ 0 & otherwise \end{cases}$$

where $\tilde{\hat{y}}_i = \hat{y}_i - median(y)$, $\tilde{y}_i = y_i - median(y)$, $\hat{y}_i(y_i)$ denotes predicted (true) revenue surprise of a company at a specific date, sign($\cdot$) denotes the sign function, and median($\cdot$) represents the median of the predicted (true) revenue surprise of data points of all the companies within the same quarter as the i-th data point. Here, $DirAcc_i$ and $MagAcc_i$ are used to denote the Directional Hit/Miss and Magnitude Hit/Miss of data point i, and $\alpha$, $\beta$ and $\gamma$ are 3 parameters denoting the reward/penalty of Directional Hit, Directional Miss, and Magnitude Hit. In the experiments, the system and/or method may set $\alpha = \$5.00$, $\beta = \$6.11$ and $\gamma = \$2.22$.

The DirAcc measures the percentage of predictions among all the companies that are more "directional" accurate than the industry benchmark, for long/short investment decisions. The DirAcc uses the median as the anchor to adjust both the prediction and the label in order to cancel the seasonal trend within a quarter. The MagAcc evaluates the percentage of predictions that are significantly (50%) more accurate than the industry benchmark, which is used as an input for optimizing the weight of stocks in a portfolio. Given $DirAcc_i$ and $MagAcc_i$, the task-based goal is to maximize the average profit the model earned from n predictions, i.e., $$\frac{1}{n}\sum_{i=1}^{n} DirAcc_i + MagAcc_i.$$

Since algorithm 1 minimizes the loss function, the system and/or method may use the negative of equation as the task-based loss in TOPNets.

Benchmark Methods (i) Models that are Trained with Standard Machine Learning Loss Function:

In this regression task, the system and/or method may select mean square error (MSE) loss and mean absolute error (MAE) loss as candidates of standard machine learning loss functions.

(ii) Models that are Trained with Heuristic Surrogate Loss Functions:

Given the task-based criteria, it is observed that a proper heuristic surrogate loss function could be designed by approximating $DirAcc_i$ and $MagAcc_i$ using tan h($\cdot$), i.e., $$DirAcc_i \approx \alpha(1+sign(\tilde{\hat{y}}_i \cdot \tilde{y}_i))/2 + \beta(1-sign(\tilde{\hat{y}}_i \cdot \tilde{y}_i))/2$$

$\approx \alpha(1+\tan h(k\cdot\tilde{\hat{y}}_i\cdot\tilde{y}_i))/2+\beta(1-\tan h(k\cdot\tilde{\hat{y}}_i\cdot\tilde{y}_i)/2$ $\text{MagAcc}_i \approx \gamma(1+\text{sign}(0.5|y_i|-|y_i-\hat{y}_i|)/2)$ $\gamma(1+\tan h(k\cdot(0.5|y_i|-|y_i-\hat{y}_i|))/2)$ Here, k is a scale factor and the system and/or method may neglect some boundary situations such as sign($\tilde{\hat{y}}_i$)=sign($\tilde{y}_i$)=0 and $|y_i-\hat{y}_i|$=0.5$|y_i|$. An idea of this approximation is to approximate sign(x) with tan h(kx) since $\lim_{k\to+\infty}\tan h(kx)=\text{sign}(x)$. To saturate the performance of this surrogate loss function, the system and/or method can explore the best scale factor k and may find that it achieves the best performance with k=100.

Experimental Setup

By way of example, the system and/or method may use the Long Short-Term Memory (LSTM) networks as the feature extractors and 3-layer fully-connected neural networks as the predictors for all models in the experiments. For a fair comparison, the system and/or method may explore the configuration of networks for all models to saturate their performance. For LSTMs and 3-layer fully-connected networks, the number of hidden units can be chosen from [64, 128, 256, 512, 1024]. In TOPNets, in an embodiment, the task-oriented loss estimator T is a 3-layer fully-connected neural network with hidden units 1024, 512, 256.

Performance Analysis

By way of example, 15 runs can be performed for all models with different random seed to compute the mean and the standard error of their performance. The system and/or method may "warm up" the predictor. In an aspect, the performance of TOPNets was investigated with different warm-up losses (denoted as TOPNet_MAE, TOPNet_MSE, TOPNet_Heuristic, and TOPNet_NoWarmUp). It can be shown that TOPNets significantly outperformed the standard machine learning models trained with either MSE or MAE, boosting the average profit by about 30%. TOPNets also outperformed the model trained using the hand-crafted heuristic surrogate loss function, showing the advantage of using an optimized learnable surrogate loss. In the experiments, warming up the predictor significantly (14%) boosts the performance compared with the TOPNet without a warm-up step (TOPNet_NoWarmUp). It is observed that though the model trained with the heuristic loss alone achieved a better performance than the models trained with MSE or MAE, the heuristic loss made it harder to further improve the predictor with the learned surrogate loss. The same phenomenon can also be found in the next task.

The following described credit risk modeling application as another use case example. In this example, the main elements of credit risk modeling include the estimation of the probability of default and the loss given default. In this experimental study, the data includes 1.3 million loan applications and their payment history. Each loan is associated with an 88-dimensional feature vector and a binary label denoting whether the loan application is defaulted or not. The feature vector includes information such as the loan status (e.g., current, fully paid, default or charged off), the anonymized applicant's information (e.g., asset, debt, and credit scores) and the loan characteristics (e.g., amount, interest rate, various cost factors of default), etc. The whole dataset can be split randomly into a training set (e.g., 80%), a validation set (e.g., 10%), and a test set (e.g., 10%) to evaluate model performance.

Task-Based Criteria

The credit risk data provides information to compute the profit/loss of approving a loan application, i.e., Profit/Loss=(ReceivedPrinciple+ReceivedInterest−FundedAmount)+(RecoveryAmount−Recoverycost)

Note also that, the recovery happens only if the loan has defaulted and that if one rejects a loan application, one simply earns $0 from it. Recall in credit risk modeling, the task-based criteria involve the prediction of the default probability $p_i$ of the i-th loan application as well as the probability decision threshold $p_D$ to maximize the profit after approving all loan applications with a default probability lower than $p_D$ i.e., $$\frac{1}{n}\sum_{i=1}^{n}\text{Profit/Loss}_i\cdot I\{p_i<p_D\}+0\cdot I\{p_i\geq p_D\} \quad (10)$$

Here, I{•} is used to denote the indicator function.

Benchmark Methods (i) Models that are Trained with Standard Machine Learning Loss Function:

In this classification task, the experiment selected cross-entropy loss as the standard machine learning loss.

(ii) Models that are Trained with Heuristic Surrogate Loss Functions:

Given the profit/loss of approving a loan application and the predicted probability of default $p_i$, a natural surrogate loss function is, $(1-p_i)\cdot\text{profit/loss}+p_i\cdot 0$, which measures the expected profit/loss given $p_i$.

Experimental Setup

In this experimental setup, the system and/or method can use 3-layer fully-connected neural networks with hidden units 1024, 512, 256 for the feature extractors G of all models, and the predictors P are linear layers. In TOPNets, in an embodiment, the task-oriented loss estimator T is a 3-layer fully-connected neural network with hidden units 1024, 512, 256.

In this task, the evaluation criteria may optimize the decision probability threshold $p_D$ to maximize the average profit via a validation set. Specifically, it may sort the data points based on the predicted default probability $p_i$ and optimize the threshold $p_D$ based on the cumulative sum of the profit/loss of approving load applications with $p_i<p_D$. In an embodiment, TOPNet can require point-wise task-based loss as the feedback from the task-based criteria in the training phase. However, computing the task-based loss involves making decisions (approve/reject), which requires the decision probability threshold $p_D$ that is supposed to be optimized on the validation set. Noting that, the decision probability threshold $p_D$ is a relative value that depends on the predicted default probability $p_i$. Therefore, maintaining the order of predicted probabilities while shrinking or increasing them together does not affect the ultimate profit but leads to a different optimal threshold. Conversely, given a fixed decision threshold $p_D$ (e.g., 0.5), the system and/or method can learn a predictor that predicts the default probability with respect to the threshold. Thus, in the learning process of TOPNet, the system and/or method can use a fixed decision threshold (0.5) to make decisions and provide task-based losses in Algorithm 1. During the test, the system and/or method may apply the same threshold optimization process on the predictions made by TOPNets as other models.

Performance Analysis

In this experiment, 15 runs are performed for all models with different random seed to compute the mean and the standard error of their performance. The performance was evaluated of TOPNets that use cross-entropy loss or heuristic loss as the warm-up loss function (denoted as TOPNet_CE and TOPNet_Heuristic). The performance was also evaluated of the TOPNet without a warm-up step. It can be shown that TOPNets significantly outperformed the standard machine learning models learned with cross-entropy, boosting the average profit by $165.7. Taking advantage of the optimized learnable surrogate loss function, the TOPNet warmed-up with cross-entropy loss further boosts the profit by $13.5 per loan compared with the model trained using the heuristic loss function. Similar to the phenomenon in the previous task, the TOPNet warmed-up with the heuristic loss function performed slightly worse than the TOPNet warmed-up with cross-entropy loss.

Task-Oriented Prediction Network (TOPNet), a generic learning scheme automatically integrates the true task-based evaluation criteria into an end-to-end learning process via a learnable surrogate loss function. Tested on two real-world financial prediction tasks, experiments demonstrate that TOPNet can significantly boost the ultimate task-based goal, outperforming both traditional modeling with standard losses and modeling with heuristic differentiable (relaxed) surrogate losses. In another aspect, the system and/or method may further explore integrating task-based criteria that involve a strong connection among multiple data points.

Figure 2:
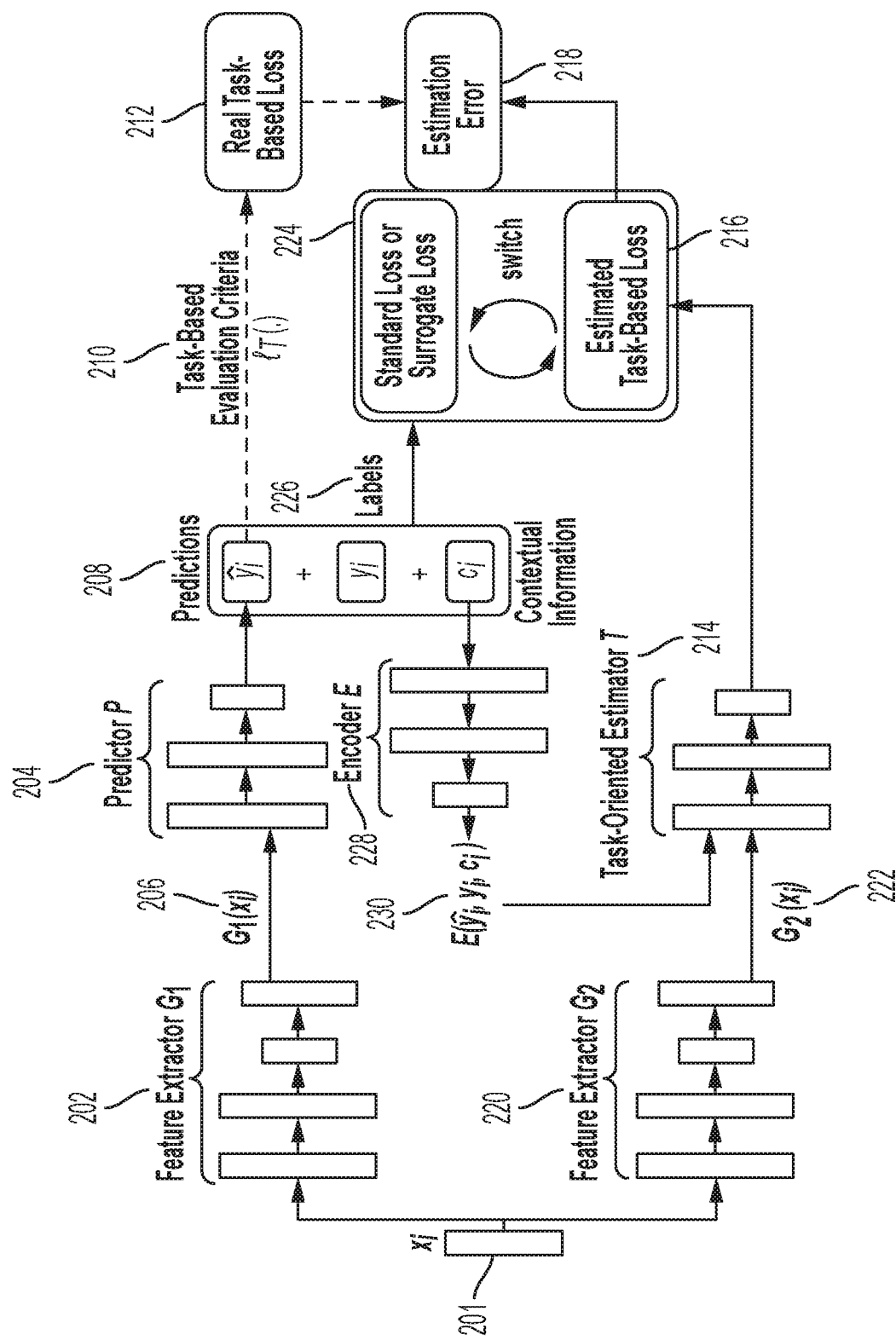
FIG. 2 is illustrates an overview of the Task-Oriented Prediction Network in another embodiment.

FIG. 2 is illustrates an overview of the Task-Oriented Prediction Network (TOPNet) in another embodiment. An end-to-end learning framework can be implemented with the OPTNet. A feature extractor $G_1$ 202 is first applied to extract meaningful features from the raw input data $x_i$ 201. Then, a predictor network P 204 takes the extracted feature $G_1(x_i)$ 206 to make prediction $P(G_1(x_i))=\hat{y}_i$ 208. Given the prediction $\hat{y}_i$, the ground truth label $y_i$ and contextual information $c_i$ concerning the task, as shown at 208, a task-based evaluation criterion 210, which potentially involves a decision-making optimization process, provides a task-based loss $l_T(\hat{y}_i, y_i, c_i)$ 212 measuring the predictive performance on the data point $x_i$.

A feature extractor $G_2$ 220 extracts input feature $G_2(x_i)$ 222 from the raw input data $x_i$ 201. An encoder E 228 encodes the predictions $\hat{y}_i$, labels $y_i$, the contextual information $c_i$ into an embedding vector, $E(\hat{y}_i, y_i, c_i)$. To automatically integrate the task-based loss into the end-to-end learning process, the system and/or method in an embodiment implements a task-oriented estimator network T 214, which takes both the extracted input feature $G_2(x_i)$ 222, the encoding $E(\hat{y}_i, y_i, c_i)$ 230 of the predictions $\hat{y}_i$, labels $y_i$, the contextual information $c_i$, to approximate the task-based loss 216.

By way of example, in an embodiment, for classification tasks, where the label space is $\mathcal{Y}=\{0, 1, \ldots, l\}$ the predictor network P 204 may predict a probability distribution $p_{i,0}, \ldots, p_{i,l}$ over all possible labels (instead of a discrete value), given input feature $x_i$. Hence, the task-oriented estimator network T 214 estimates the task-based loss for all possible labels and approximates the real task-based loss with the expectation of the estimated taskbased losses.

By way of another example, in an embodiment, for regression tasks, where the label space $\mathcal{Y} \in \mathbb{R}$, the predictor network P 204 directly predicts the label $\hat{y} \in \mathbb{R}$. Then, the task-oriented estimator network T 214 directly estimates the task-based loss given the current prediction $\hat{y}$. With the estimated task-based loss, the system and/or method in an embodiment can optimize the predictor network toward the task-based goal.

TOPNet in an embodiment hybridizes the surrogate loss function and the estimated task-based loss 216 in a way that the predictor 204 switches between the surrogate loss 224 and the estimated task-based loss 216 depending on the estimation error 218 of the task-oriented estimator 216, bridging the supervision from both the labels 226 and the task-based criteria 210. In an embodiment, TOPNet utilizes the supervision from labels to "warm up" a reasonable predictor with the surrogate loss function, so that the task-oriented estimator only needs to estimate the task-based loss well when the predictor makes reasonable predictions. This can be much easier than learning a universal estimator for arbitrary predictions. Conversely, a well-learned task-oriented estimator would also improve the predictor, which collaboratively forms a virtuous circle for the learning of both the task-oriented estimator network and the predictor network.

In an embodiment, the feature extractors 202 and 220 can be a Long Short-Term Memory (LSTM) network. In another embodiment, the feature extractors 202 and 220 can be a neural network such as a 3-layer fully-connected neural network. An encoder 230 can also be a neural network such as a 3-layer fully-connected neural network. In an embodiment, the predictor P 204 can be any machine learning model, for example, a neural network such as a 3-layer fully-connected neural network with a number of hidden units. A neural network can be implemented with any other number of layers and number of hidden units. In an embodiment, the task-oriented estimator T 214 can be a neural network, for example, a 3-layer fully-connected neural network with hidden units. In an embodiment, Any other machine learning models can be implemented for the feature extractors 202, 220, predictor P 204, encoder 228, and task-oriented estimator T 214.

Algorithm 2 summarizes a pseudocode of an end-to-end learning scheme for TOPNet in another embodiment. In an embodiment, TOPNet integrates a surrogate loss function $l_S(\cdot, \cdot, \cdot)$ into the learning process, which can either be a designed task-specific surrogate loss or a standard machine learning loss function. In this embodiment, the system and/or method may use an estimation error threshold $\epsilon$ to switch the learning loss function between the surrogate loss and the estimated task-based loss, which enables TOPNet to "warm up" both the predictor P and the task-oriented estimator T using the designed surrogate loss at the early stage. The choice of the hyperparameter $\epsilon$ depends on the scale of the task-based loss.

---

Algorithm 2: End-to-End learning process for TOPNet

---

Input: $x_i$, $y_i$ and $c_i$ are raw input features, label and
corresponding contextual information sampled from the training set.
$l_S(\cdot, \cdot, \cdot)$ is the designed surrogate loss function or a standard
machine learning loss. $\epsilon$ is the maximal tolerance of the estimation
error of the task-based loss.
For ease of presentation, the algorithm uses the update of one data
point as an example.
 1: Make prediction $\hat{y}_i = P(G_i(x_i))$.
 2: Evaluate the prediction $\hat{y}_i$ using task-based criteria given the
label $y_i$ and the contextual information $c_i$, and get a task-based
loss $l_T(\hat{y}_i, y_i, c_i)$.
 3: Encode the prediction $\hat{y}_i$, the label $y_i$, and the contextual
information $c_i$ into an embedding $E(\hat{y}_i, y_i, c_i)$ via Encoder E ($\cdot$).
 4: Encode the input features $x_i$ into $G_2(x_i)$ via feature extractor $G(\cdot)$.
 5: If $(T([G_2(x_i); E(\hat{y}_i, y_i, c_i)]) - l_T(\hat{y}_i, y_i, c_i))^2 < \epsilon$ then ---
Algorithm 2: End-to-End learning process for TOPNet 6:     Update the predictor P and the feature extractor $G_1$ by:

$$\min_{G_1,P} T([G_2(x_i); E(P(G_1(x_i)), y_i, c_i)])$$

7:   else
8:     Update the predictor P and the feature extractor $G_2$ by:

$$\min_{G_1,P} l_s(P(G_1(x_i)), y_i, c_i)$$

9:   end if
10: Update the task-oriented estimator T, the encoder E and the feature extractor $G_2$ by:

$$\min_{T,E,G_2} (T([G_2(x_i); E(\hat{y}_i, y_i, c_i)]) - 1_T(\hat{y}_i, y_i, c_i))^2$$

Here, the algorithm uses the formulation of regression tasks as an example. Similar formulation for classification tasks can be derived.

---

A method of a learning framework, for example, according to Algorithm 2 and FIG. 2, in an aspect, may include the following processing.
1. Make the prediction $\hat{y}$ from the current predictor.
2. Evaluate the reward/loss of the prediction $\hat{y}$ based on the task-based criteria using both labels and necessary contextual information.
3. An encoder encodes the prediction, the labels and the contextual information into an embedding vector.
4. A feature extractor extracts a semantic embedding from the input feature x.
5. The task-oriented estimator estimates the expected reward/loss given the two embeddings of features, predictions, labels and contextual information.
6. If the estimated reward/loss is close to the real reward/loss, the method updates the predictor to improve the estimated reward.
7. Otherwise, the method updates the predictor to improve with respect to a surrogate loss function or a standard machine learning loss.
8. Update the task-oriented estimator to minimize the difference between the estimated reward/loss and the real reward/loss.

A general end-to-end learning framework can automatically integrate task-oriented evaluation criteria, which are usually not aligned with standard learning metrics and non-differentiable, into the learning process via a task-oriented estimator, and directly learn a model that directly optimizes the ultimate task-based goal/profit.

Figure 3:
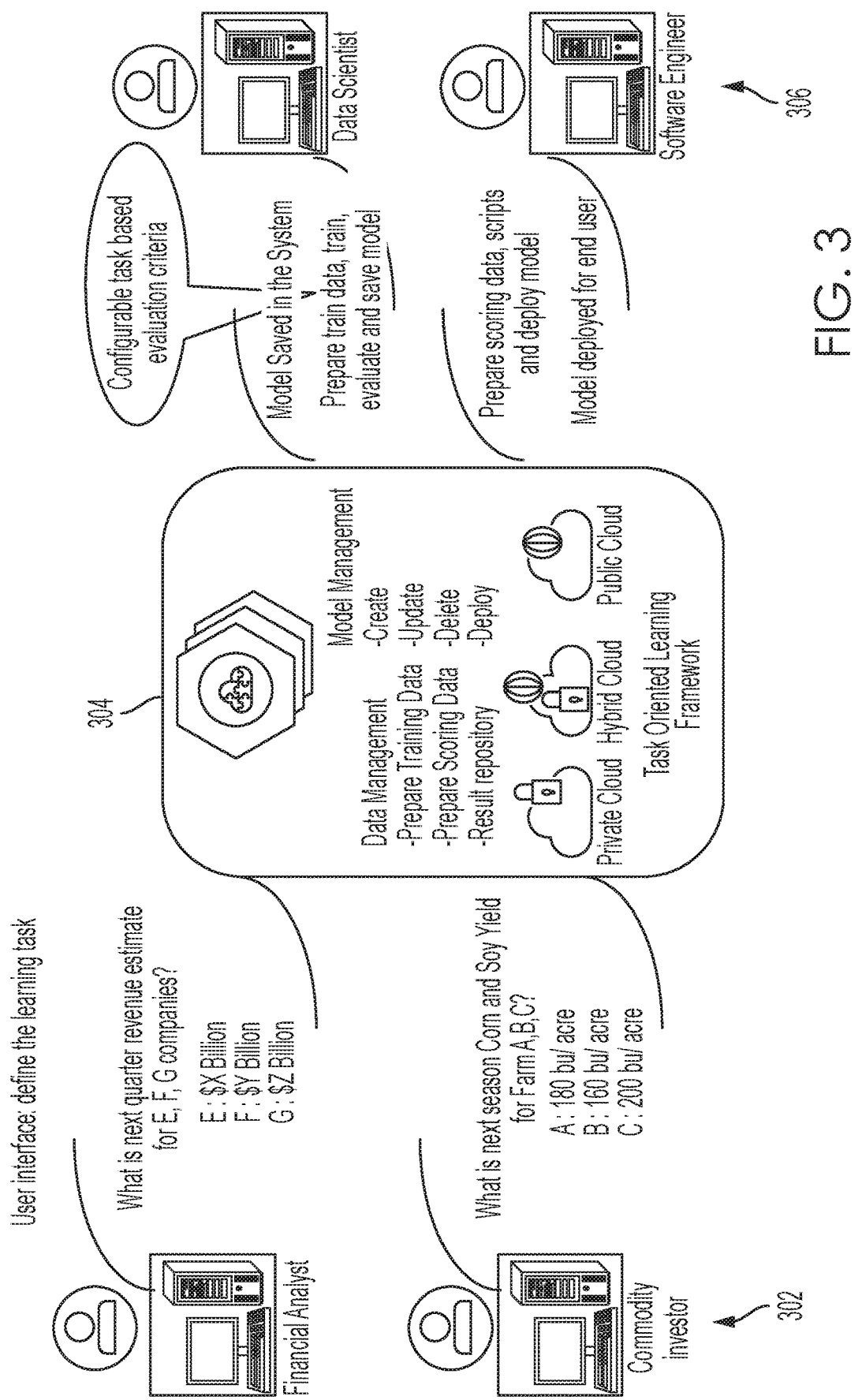
FIG. 3 is a diagram illustrating an overview of task oriented learning framework deployed on a cloud-based environment in an embodiment.

In another aspect, a system such as a cloud-based system can be provided to deploy the learning framework in a given domain such as, but not limited to, a financial service domain. Such a learning framework can provide a tool for financial forecasting, credit risk modeling, and/or another financial service. For instance, as non-limiting examples, a financial forecasting tool, utilizing the learning framework, can forecast company revenue surprise, for example, by period such as quarterly forecast, calculate income based on forecast performance with respect to the given performance metrics, and determine loan accept or reject decisions with respect to the expected profit. FIG. 3 is a diagram illustrating an overview of task oriented learning framework deployed on a cloud-based environment in an embodiment. A task-oriented learning framework 304 may implement one or more embodiments of a methodology described above with respect to TOPNet. The framework 304 may reside in one or more private cloud, hybrid cloud and/or public cloud. The cloud-based framework 304 may allow for data management and model management for machine learning models, which can capture task-oriented objectives as loss functions in the machine learning models. Data management operations can include preparing data for model training and prediction, managing results repository. Model management can include creating, updating, deleting and deploying one or more machine learning models, for example, trained according to the TOPNet methodology described above, which captures task-oriented objectives, for example, based on task-oriented criterion or criteria, as loss functions of machine learning models. Users 306 such as a data scientist, software engineer, or another user can be given access to the cloud-based task-oriented learning framework 304 to perform such data management and model management. For example, a data scientist may prepare training data, train or build neural network or other machine learning models, evaluate the built models and save them for use by one or more end users. As another example, a software engineer may prepare scoring data, scripts and deploy a model, for example, for one or more end users. One or more end users 302 may run one or more model, for example, built and saved on the framework 304, for one or more of prediction and classification pertaining to their domain. For instance, a model can be run by a financial analyst to predict next quarter revenue for a company or a number of companies. As another example, a commodity investor may run a model to predict next season's crop yield for one or more farms. A user interface software or tool can provide components to observe and analyze results in a form including but not limited to graphical user interfaces. A graphical user interface, for example, can present visualization of the resulting model runs or predictions. A user, for example, can log on to a cloud-based computing environment and access the graphical user interface, to run a prediction model and visualize analysis results.

Figure 4:
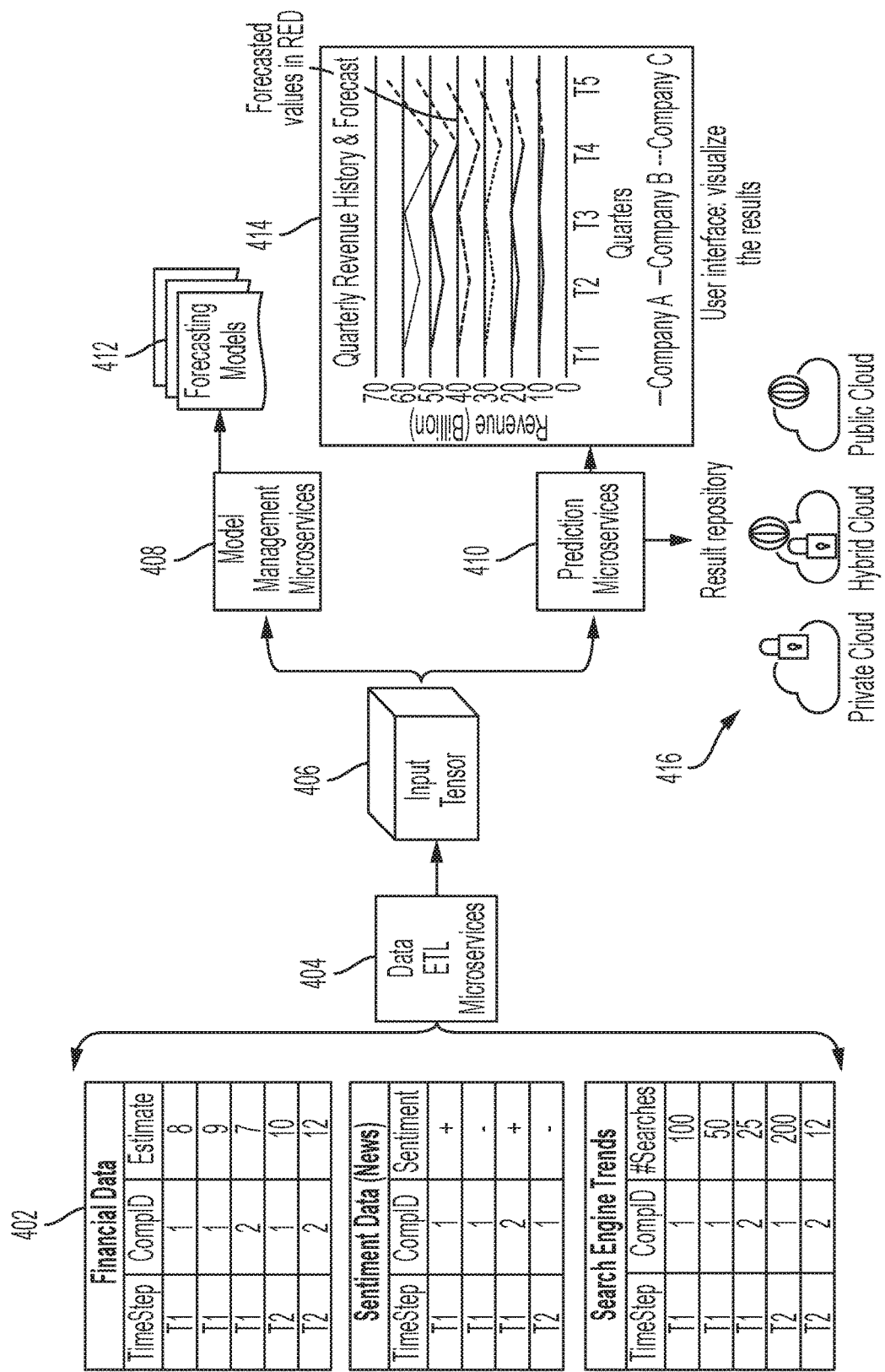
FIG. 4 is another diagram illustrating a system architecture in an embodiment.

FIG. 4 is another diagram illustrating a system architecture in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

Data or ETL (extract, transform and load) microservices 404 may process various data 402, for example, synthesize or prepare raw data for machine learning. Such data, for example, can be transformed into input tensor 406, for example, multi-dimensional array or feature vectors or feature data. Input tensor 406 can be used by one or more model management microservices 408, which may create, build and/or train one or more machine learning or neural network models 412. Such models 412 may include forecasting models or other models. Prediction microservices 410 may use input tensor 406, for example, as test data, to make predictions by running one or more trained models. Results of predictions can be stored in a result repository, for example, on a cloud-based system 416. A user interface or a graphical user interface (GUI) tool can be provided, which can visualize in various manner, the results of the prediction, for example, graphically. Example visualization is shown at 414. Microservices 404, 408, 410 can be provided on a cloud-based computing environment, which a user can access.

A configurable tool which can utilize task-oriented learning scheme for training a machine learning model such as a neural network, for example, on a cloud-based system, can be provided. The task-oriented learning scheme automatically integrates the ultimate performance/reward metrics into model learning process. The task-oriented learning scheme designs heuristic reward loss functions for the customized performance metrics, builds an encoder network to encode the predictions, labels and the reward related contextual information into latent embeddings and applies batchwise attention mechanism to capture the correlation among predictions, which can improve the estimation of overall performance, e.g., ranking, relative direction, etc. A reward estimator network can be built to estimate the expected reward given input features and the latent embeddings. The task-oriented learning scheme can optimizes the predictor network based on both the heuristic reward loss and the approximated reward from the reward estimator network, and optimize both the encoder network and the reward estimator network to better approximate the real reward.

Figure 5:
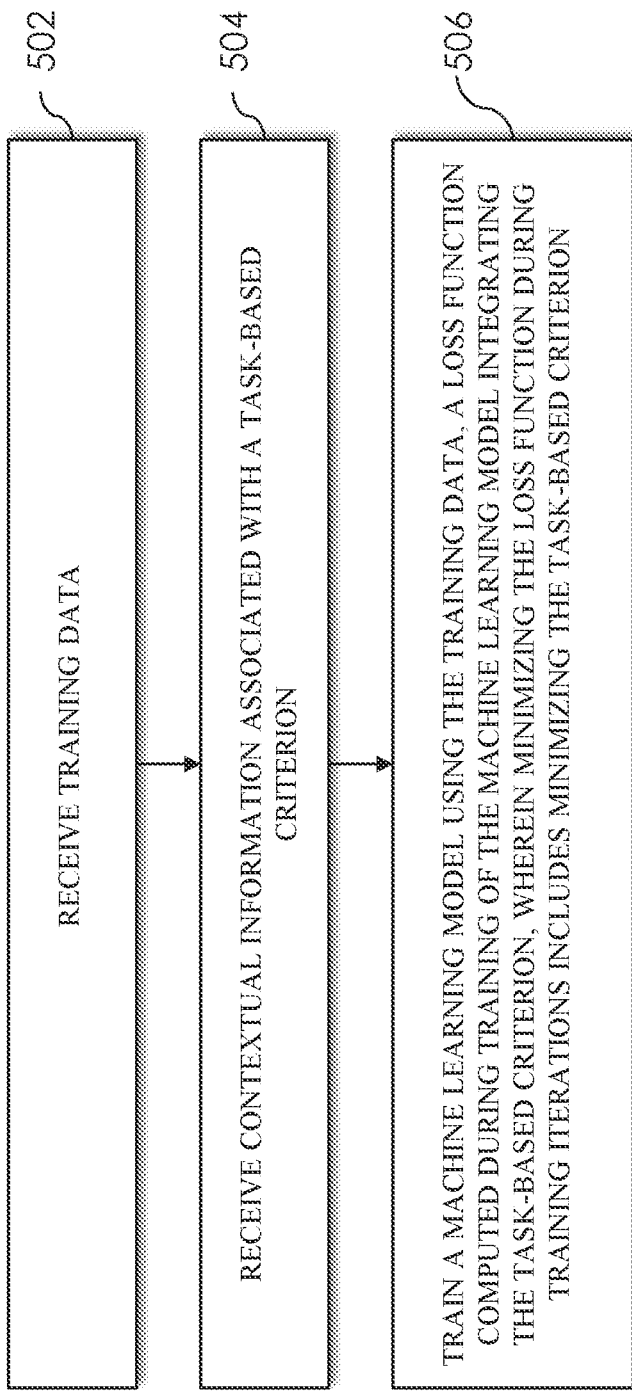
FIG. 5 is a flow diagram illustrating a method in an embodiment.

FIG. 5 is a flow diagram illustrating a method in an embodiment. The method can be executed on or by one or more processors such as one or more hardware processors. One or more hardware processors can be processors provided on a cloud-based computing environment. The method can be configured to build a neural network predictor, or another machine learning model, for providing predictions for a given domain, for example, configured by one or more users. At 502, the method may include receiving training data. At 504, the method can include receiving contextual information associated with a task-based criterion. At 506, the method can include training a machine learning model using the training data. In an aspect, a loss function computed during the training integrates the task-based criterion, and minimizing the loss function during training iterations includes minimizing the task-based criterion. In an embodiment, the machine learning model includes a neural network. As described above, the method can also include learning a surrogate loss function that is differentiable, to guide the machine learning model. The machine learning model can be updated using gradients obtained from the learned surrogate loss function. In an embodiment, the surrogate loss function can be learned via a neural network parameterized by a weight. In an embodiment, the surrogate loss function is initialized with a warm-up loss function. The method can further include approximating a true task-based loss by minimizing a discrepancy between a surrogate loss from the learned surrogate loss function and the true task-based loss. In an embodiment, approximating a true task-based loss can be performed by a neural network. The method can also include providing a framework for building, maintaining and running the machine learning model, for example, on a cloud-based system, which includes sharable resources. The method can also include extracting by a long short-term memory (LSTM) network features from the training data, wherein the machine learning model is trained based on the features.

Figure 6:
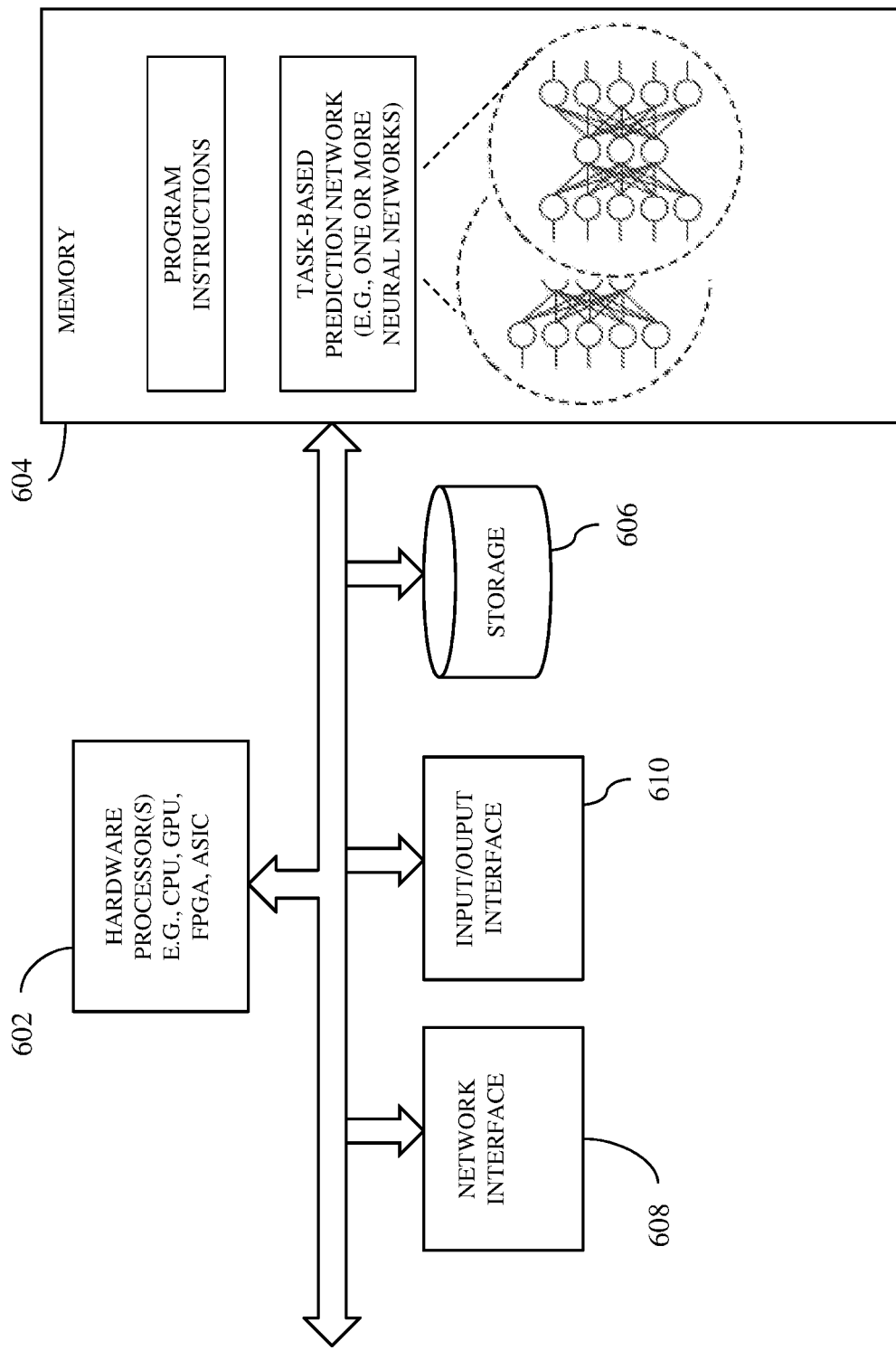
FIG. 6 is a diagram showing components of a system in one embodiment that provides a task-based learning and task-directed prediction network.

FIG. 6 is a diagram showing components of a system in one embodiment that can provide a task-based learning and task-directed prediction network. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a task-based prediction model. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive training data, receive contextual information associated with a task-based criterion, and train a machine learning model using the training data, wherein a loss function computed during training of the machine learning model integrates the task-based criterion, and wherein minimizing the loss function during training iterations includes minimizing the task-based criterion. In an aspect, received data may be stored in a storage device 606 or received via a network interface 608 from a remote device, and may be temporarily loaded into a memory device 604 for building or generating the prediction model. The learned prediction model may be stored on a memory device 604, for example, for execution by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
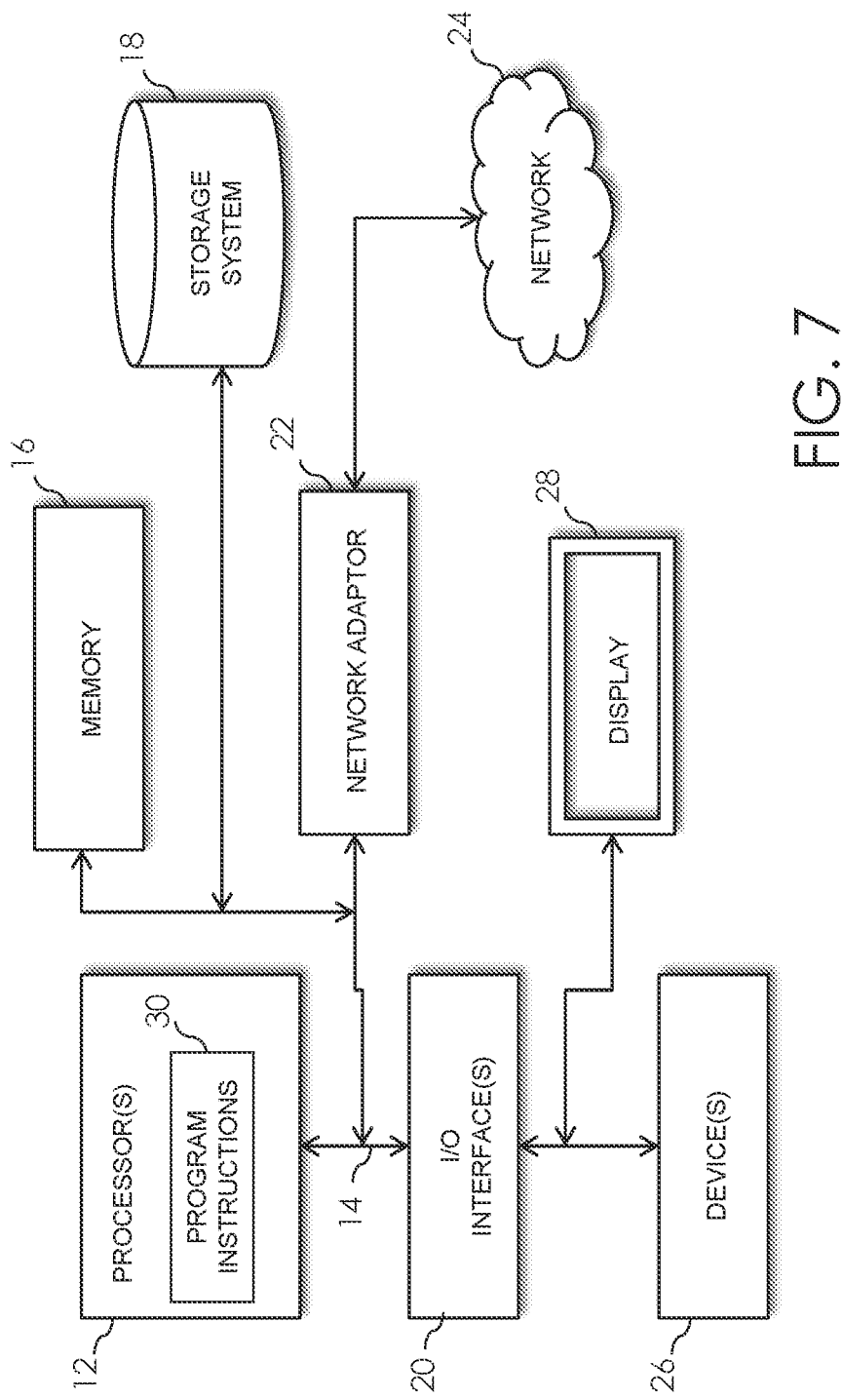
FIG. 7 illustrates a schematic of an example computer or processing system that may implement a task-based learning system in an embodiment.

FIG. 7 illustrates a schematic of an example computer or processing system that may implement a system in an embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
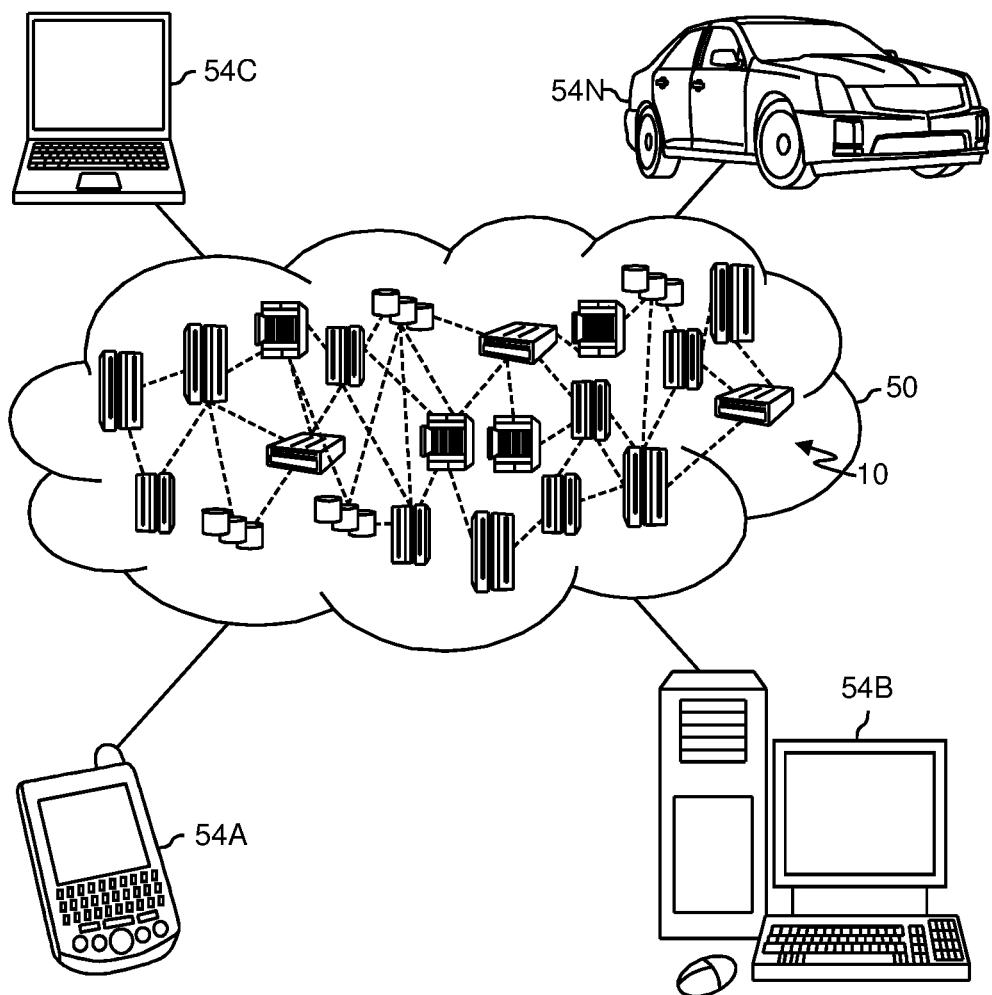
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
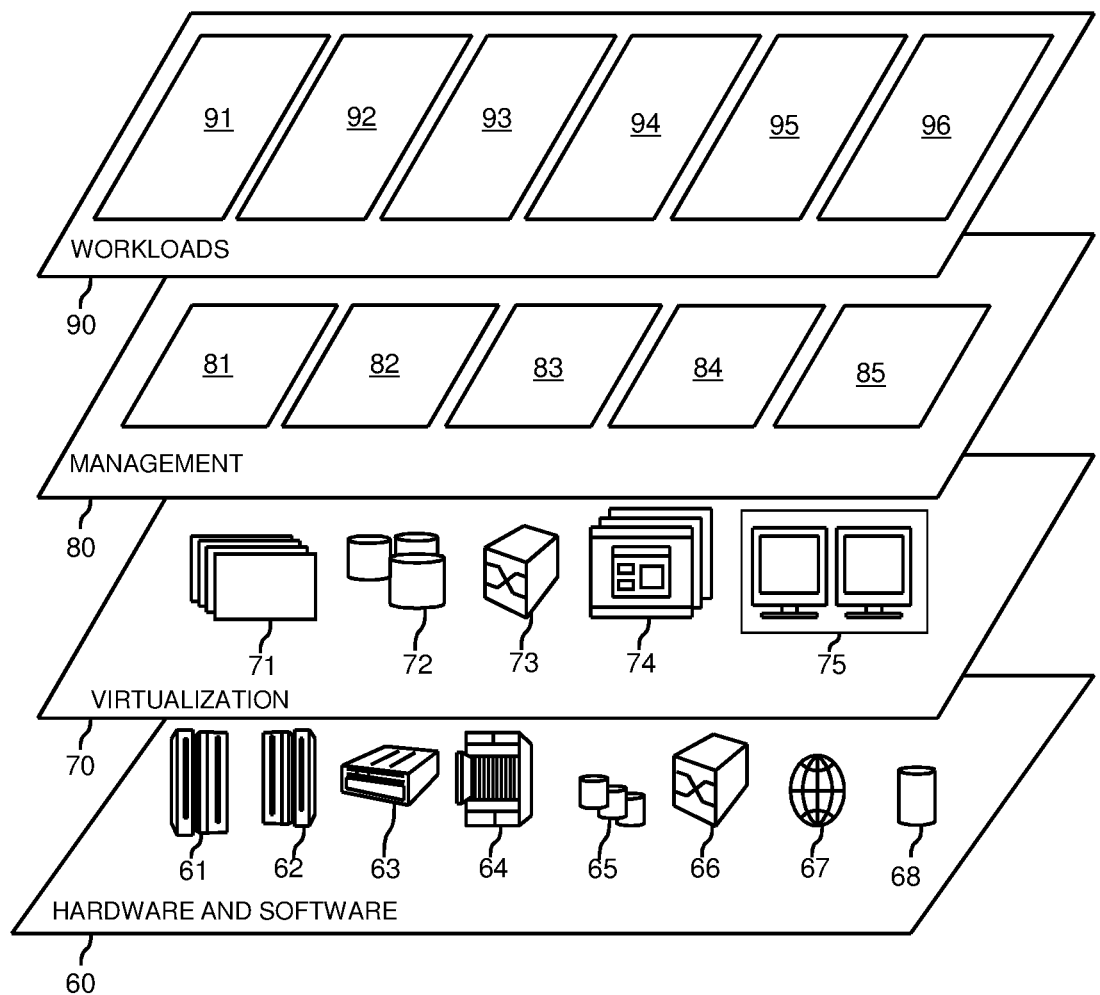
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task-based learning and task-directed prediction network processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
receiving training data;
receiving contextual information associated with a task-based criterion; and
training a machine learning model using the training data, wherein a loss function computed during the training integrates the task-based criterion, and wherein minimizing the loss function during training iterations includes minimizing the task-based criterion,
the minimizing the task-based criterion including at least
generating true task-based loss using predictions of the machine learning model, ground truth labels associated with the predictions of the machine learning model, and the contextual information,
training a task-oriented loss estimator network that takes encodings of at least the predictions of the machine learning model, the ground truth labels associated with the predictions of the machine learning model, the contextual information, and that minimize a discrepancy between learned loss of the task-oriented loss estimator network and the true task-based loss,
wherein the training the machine learning model includes, responsive to determining that the discrepancy is less than a threshold value, updating parameters of the machine learning model based on the learned loss of the task-oriented loss estimator network, and responsive to determining that the discrepancy is not less than the threshold value, updating parameters of the machine learning model based on standard loss of the machine learning model.

2. The method of claim 1, further including providing a tool for building and managing the machine leaning model on a computing environment, the computing environment allowing an on-demand network access to a shared pool of configurable computing resources, the configurable computing resources including at least one of networks, network bandwidth, servers, processing, memory, storage, applications, virtual machines, and services.

3. The method of claim 1, wherein the machine learning model includes a neural network.

4. The method of claim 1, further including learning a surrogate loss function that is differentiable, to guide the machine learning model.

5. The method of claim 4, wherein the machine learning model is updated using gradients obtained from the learned surrogate loss function.

6. The method of claim 4, wherein the surrogate loss function is learned via a neural network parameterized by a weight.

7. The method of claim 4, wherein the surrogate loss function is initialized with a warm-up loss function.

8. The method of claim 4, further including approximating a true task-based loss by minimizing a discrepancy between a surrogate loss from the learned surrogate loss function and the true task-based loss.

9. The method of claim 8, wherein the approximating is performed by a neural network.

10. The method of claim 1, further including extracting by a long short-term memory (LSTM) network features from the training data, wherein the machine learning model is trained based on the features.

11. A system comprising:
a hardware processor; and
a memory device coupled with the hardware processor,
the hardware processor configured to:
receive training data;
receive contextual information associated with a task-based criterion; and
train a machine learning model using the training data, wherein a loss function computed during training of the machine learning model integrates the task-based criterion, and wherein minimizing the loss function during training iterations includes minimizing the task-based criterion,
the minimizing the task-based criterion including at least
generating true task-based loss using predictions of the machine learning model, ground truth labels associated with the predictions of the machine learning model, and the contextual information,
training a task-oriented loss estimator network that takes encodings of at least the predictions of the machine learning model, the ground truth labels associated with the predictions of the machine learning model, the contextual information, and that minimize a discrepancy between learned loss of the task-oriented loss estimator network and the true task-based loss,
wherein the hardware processor is configured to train the machine learning model at least by, responsive to determining that the discrepancy is less than a threshold value, updating parameters of the machine learning model based on the learned loss of the task-oriented loss estimator network, and responsive to determining that the discrepancy is not less than the threshold value, updating parameters of the machine learning model based on standard loss of the machine learning model.

12. The system of claim 11, wherein the machine learning model includes a neural network.

13. The system of claim 11, wherein the hardware processor is further configured to learn a surrogate loss function that is differentiable, to guide the machine learning model.

14. The system of claim 13, wherein the hardware processor is further configured to update the machine learning model using gradients obtained from the learned surrogate loss function.

15. The system of claim 13, wherein the hardware processor is further configured to learn the surrogate loss function via a neural network parameterized by a weight.

16. The system of claim 13, wherein the hardware processor is further configured to initialize the surrogate loss function with a warm-up loss function.

17. The system of claim 13, wherein the hardware processor is further configured to approximate a true task-based loss by minimizing a discrepancy between a surrogate loss from the learned surrogate loss function and the true task-based loss.

18. The system of claim 17 wherein a neural network performs the minimizing a discrepancy between a surrogate loss from the learned surrogate loss function and the true task-based loss to approximate the true task-based loss.

19. A computer program product comprising a computer readable storage medium having program instructions embodied therewith, the program instructions readable by a device to cause the device to:

receive training data;
receive contextual information associated with a task-based criterion; and
train a machine learning model using the training data, wherein a loss function computed during training of the machine learning model integrates the task-based criterion, and wherein minimizing the loss function during training iterations includes minimizing the task-based criterion,
the minimizing the task-based criterion including at least
generating true task-based loss using predictions of the machine learning model, ground truth labels associated with the predictions of the machine learning model, and the contextual information,
training a task-oriented loss estimator network that takes encodings of at least the predictions of the machine learning model, the ground truth labels associated with the predictions of the machine learning model, the contextual information, and that minimize a discrepancy between learned loss of the task-oriented loss estimator network and the true task-based loss,
wherein the device is caused to train the machine learning model at least by, responsive to determining that the discrepancy is less than a threshold value, updating parameters of the machine learning model based on the learned loss of the task-oriented loss estimator network, and responsive to determining that the discrepancy is not less than the threshold value, updating parameters of the machine learning model based on standard loss of the machine learning model.

20. The computer program product of claim 19, wherein the machine learning model includes a neural network.

* * * * *